United States Patent

[11] 3,544,755

[72] Inventors William J. Phillips
La Palma;
Leolf M. Reese, Hawthorne, California
[21] Appl. No. 722,188
[22] Filed April 18, 1968
[45] Patented Dec. 1, 1970
[73] Assignee The Garrett Corporation
Los Angeles, California
a corporation of California

[54] METHOD FOR THE PERCUSSIVE WELDING OF STUDS
3 Claims, No Drawings
[52] U.S. Cl. .................................................... 219/99
[51] Int. Cl. ..................................................... B23k 9/20
[50] Field of Search .......................................... 219/99, 98, 73, 74

[56] References Cited
UNITED STATES PATENTS
| | | | |
|---|---|---|---|
| 2,518,463 | 8/1950 | Graham | 219/99 |
| 2,694,764 | 11/1954 | Muller | 219/74 |
| 2,377,048 | 5/1945 | Smith | 219/73 |

*Primary Examiner*—J. V. Truhe
*Assistant Examiner*—R. O'Neill
*Attorney*—John N. Hazelwood and H. Vincent Harsha ABSTRACT: A process for the percussive welding of studs, wherein a mixture of water and strontium chloride is employed during welding as a wet continuous coating upon the surface to which the stud is to welded.

METHOD FOR THE PERCUSSIVE WELDING OF STUDS

This invention pertains in general to percussive welding and more particularly to an improved method for the percussive welding of metal studs and associated metal workpieces. The invention has particular applicability to titanium and titanium alloy studs and workpieces.

There are described, in U.S. PAT. Nos. 2,610,278 and 2,518,463, method and apparatus for the percussive welding of studs. Use of this stud-welding process presents a number of advantages over conventional arc-welding processes. Studs may be welded to relatively thin plates without distortion. The welds may be applied within confined spaces or where only one side of the stud-receiving workpiece is conveniently accessible for the welding operation. This obviously opens a wide range of possible applications not heretofore available to the design engineer. Nevertheless, this process has had serious limitations, particularly in the welding of titanium and titanium alloy studs and workpieces, caused at least in part by the large amounts of material expelled during welding which adhere to workpieces receiving the studs. Further, the weld is frequently characterized by porosity and inclusion of contaminants, as well as lack of workpiece penetration by the weld, and inconsistent strength in shear.

Accordingly, it is an object of this invention to provide a process which permits the successful welding of studs, particularly those of titanium or titanium alloys, eliminating the above problems and providing welds with a high degree of structural integrity.

Another object is to provide a process, as described, which is simple and reliable and which is practicable and economical for production application.

Still another object is to provide a process, as aforesaid, which is well suited to applications calling for maintenance of close tolerances with minimum distortion and effect upon the plate or workpiece to which the stud is welded.

Other objects and advantages of the invention will become apparent from the following description.

As above indicated, method and apparatus for the percussive welding of studs are set forth and described in U.S. Pat. Nos. 2,610,278 and 2,518,463. As there shown, a stud or wire is initially positioned in the chuck or collet of the welding head of a welding apparatus and is held normal to the surface of the workpiece or plate to which it is to be welded. The stud is designed with a reduced tip portion to provide for high current density and tip melting. When a current is passed through the stud, the workpiece is appropriately positioned beneath the stud carrying collet at a predetermined spacing from the stud and a current is then passed through the stud and workpiece. As the current flows through the stud, its reduced tip portion is caused to melt before the stud proper is forced into the workpiece. The stud and workpiece are thereby initially distanced, facilitating arc formation and melting of the workpiece. At the same time as the current flows through the stud and the workpiece, a force is imparted to the stud so as to force it into contact with the melted workpiece surface, thereby consolidating the melted metal of the stud and workpiece without distortion of the latter.

Accordingly, percussive stud welding as herein used may be defined as a resistance-welding process wherein coalescence is produced simultaneously over the entire area of abutting surfaces by heat produced from an instantaneous discharge of capacitors or like rapid application of current with a percussive force supplied during or immediately following the electrical energy discharge. The percussive force may be accomplished in various ways, as for example, through employing pneumatic or spring means. Suitable percussive force may also be provided by permitting the welding head a free fall to carry the stud into contact with the workpiece, the weight of the head and the free fall distance governing the resultant force of the stud upon the workpiece. It has been found that percussive force suitable for the percussive welding of a titanium 6A1 4V 10/32 inches stud to a titanium 6A1 4V workpiece is provided by permitting a welding head of 17 pounds total weight a free fall of 1⅞ inches.

Although satisfactory for stud welding of a number of different materials, the foregoing process has in particular not proven satisfactory for use with titanium and titanium alloy workpieces and studs in producing welds of structural integrity. Not only have such welds demonstrated a lack of strength but the have been porous and have included undesirable foreign matter. The welds have further failed adequately to penetrate into the workpiece or stud-receiving plate and have yielded inconsistent shear values.

It has been found that these problems may be eliminated and a reliable weld achieved on a repetitive production basis by employing a mixture of strontium chloride and water as a coating for the workpiece surface. After the stud has been positioned in the collet and before welding current is directed through the stud and workpiece, the mixture is applied to the workpiece surface at and surrounding the location of welding in a coating of sufficient thickness to assure coating continuity. There should thus be no water breaks or drops. If a workpiece of relatively large area is involved, masking may be employed on surfaces more remote from the weld, with the wet coating of strontium chloride being disposed at and encompassing the immediate weld area. In this connection, it is to be noted that metal is frequently expelled a substantial distance from the weld in the course of percussive welding.

With the workpiece coated with the water and strontium chloride mixture and with the surface still wet, current is applied to the stud and workpiece and a force imparted to the stud as above described. Although not wishing to be limited to any particular theory of operation, it is believed that the superior resulting weld is in substantial part the result of enhancement of electron flow between the stud and workpiece resulting from the employment of the wet strontium chloride surface coating.

The strontium chloride used in the coating mixture is chemically pure, i.e., of approximately 99½ percent purity with approximately .5 percent trace elements. Prior to mixing the water, the strontium chloride is pulverized from its crystal form, preferably to the consistancy of face powder, and then mixed with water. The water should be sufficient to thoroughly wet the strontium chloride and to provide a vehicle for carrying the strontium chloride upon the surface of the workpiece to be coated and should be present in sufficient quantity to permit maintenance of surface wetness until stud welding is accomplished.

Although not limited thereto, the method of this invention has proven particularly satisfactory for welding 6A1 4V titanium alloy studs and workpieces. Tensile and torsion tests have proven the structural integrity of the resulting welds. The stud-receiving workpiece has been free of cracks visible at ten diameters magnification.

Voids in the weld zone have not exceeded 5 percent of the stud diameter. Cross sections of the weldments have been mounted and polished and subjected to electron beam probe microanalysis to determine the presence of contamination from strontium chloride and it was indicated that all traces of wet strontium chloride were expelled during the welding operation. Further, vibration and tensile testing of the weldments showed them to be satisfactory in fatigue life and the weld strength to exceed the strength to exceed the strength of the stud itself.

We claim:

1. In the process for percussive welding of studs and workpieces, wherein a stud having an end portion of reduced cross section is positioned for welding with such portion spaced apart from the stud-receiving workpiece, a current being passed through the said reduced portion to the workpiece to generate an arc, melting the said portion and the adjacent portion of such workpiece, and a percussive blow forcing the stud into contact with the workpiece to consolidate the melted metal of the stud and workpiece, the improvement comprising applying prior to said current passage, at and immediately surrounding the area of the workpiece surface receiving the stud, a wet continuous surface coating comprising a mixture consisting essentially of water and strontium chloride, and effecting said passage of current while said surface coating is wet.

2. The method of claim 1, wherein: the stud and workpiece are comprised essentially of titanium.

3. The method of claim 1, wherein: the studs and workpieces are comprised essentially of 6A1 4V titanium alloy.